United States Patent [19]

Hammer

[11] Patent Number: 4,933,422
[45] Date of Patent: Jun. 12, 1990

[54] ACCELERATORS FOR EPOXIDE CURING AGENTS CONTAINING CYANAMIDE

[75] Inventor: Benedikt Hammer, Trostberg, Fed. Rep. of Germany

[73] Assignee: SKW Trostberg Aktiengesellschaft, Trostberg, Fed. Rep. of Germany

[21] Appl. No.: 351,789

[22] Filed: May 15, 1989

[30] Foreign Application Priority Data

May 5, 1988 [DE] Fed. Rep. of Germany ....... 3815234

[51] Int. Cl.$^5$ .............................................. C08G 59/68
[52] U.S. Cl. ..................................... 528/94; 528/117; 528/407; 548/335
[58] Field of Search .................. 548/335; 528/94, 117, 528/407

[56] References Cited

U.S. PATENT DOCUMENTS 4,358,571 11/1982 Kaufman et al. ............... 548/335 X

OTHER PUBLICATIONS

K. Potts (Editor), *Comprehensive Heterocyclic Chemistry*, vol. 5, Pergamon Press, Oxford, 1984, p. 383.
C. Hodgman et al. (Editors), *Handbook of Chemistry and Physics*, 44th Ed., Chemical Rubber Pub. Co., Cleveland, 1963, p. 1756.

*Primary Examiner*—Richard A. Schwartz
*Attorney, Agent, or Firm*—Kenneth P. Glynn

[57] ABSTRACT

Accelerators for epoxide curing agents containing cyanamide are described which use an adduct and/or reaction product of (a) a specific imidazole derivative with (b) an organic acid having a $pK_A$ value of 0.5 to 5.0.

The accelerators according to the invention impart to the epoxy resin-curing agent-accelerator system a longer shelf life compared with known accelerators.

11 Claims, No Drawings

ACCELERATORS FOR EPOXIDE CURING AGENTS CONTAINING CYANAMIDE

DESCRIPTION

The present invention relates to accelerators for epoxide curing agents containing cyanamide.

It is known that cyanamide may be used as curing agent for epoxy resin compounds. In this connection cyanamide may be used in anhydrous form (cf. DE-OS 2,122,955 and DE-OS 2,166,606) or an aqueous solution, in the presence or absence of urea according to DE-OS 2,743,015. According to DE-OS 2,459,752, the curing agent based on cyanamide may also contain special stabilizers in the form of carboxylic acids. According to DE-OS 2,932,785 it is further possible to use substituted cyanamides of organic primary amines instead of cyanamide, in which case aliphatic, cycloaliphatic, aromatic or heterocyclic radicals are introduced in the curing agent system. The preparation of these substituted cyanamides is, however, technically exacting and hence costly. Finally, DE-OS 3,510,952 proposes to use cyanamide or a mixture of cyanamide and dicyandiamide in an organic solvent. All these publications recommend tertiary amines, for example benzyldimethylamine, or imidazoles as accelerators.

The solutions of curing agents based on cyanamide and the mixtures consisting of a liquid epoxy resin or an epoxy resin solution and solid cyanamide or a cyanamide solution are usually stable for a few days. If, however, an accelerator corresponding to the prior art, which is necessary for rapid hardening, is added to these mixtures, the system epoxy resin-cyanamide-accelerator becomes unstable, i.e. a rapid increase in viscosity occurs. At higher temperatures, especially at about 40° C., it is even possible for a strong exothermic self-accelerating reaction to set in. This low shelf life of the epoxy resin-curing agent-accelerator system very seriously restricts practical application of cyanamide as epoxide curing agent.

The object forming the basis of the present invention was to develop accelerators for epoxide curing agents containing cyanamide which do not have the said shortcomings of the prior art but possess an increased shelf life of the epoxy resin-curing agent-accelerator system.

According to the invention this object is achieved by using as accelerator an adduct and/or a reaction product of (a) an imidazole of the formula

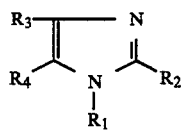

in which $R_1$, $R_2$, $R_3$ and $R_4$ are hydrogen, alkyl of 1 to 3 carbon atoms or phenyl with (b) an organic acid having a $pK_A$ value of 0.5 to 5.0. For it has been found, surprisingly, that the accelerators according to the invention keep the viscosity of the epoxy resin mixture constant over a relatively long period of time.

The accelerators according to the present invention consist of an adduct and/or a reaction product of a given imidazole derivative and an organic acid. Within the scope of the present invention the term "adduct" is understood to mean loosely linked addition products, while the term "reaction products" refers especially to salts and/or amides of the particular imidazole derivative with the corresponding carboxylic acids.

The imidazole derivatives which can be used according to the invention, may be wholly unsubstituted or substituted in the 1-, 2-, 4- and/or 5-position. Suitable substituents for this purpose are especially alkyl radicals of 1 to 3 carbon atoms in the main chain as well as phenyl radicals. The alkyl radicals may be saturated, for example methyl, ethyl or n-propyl radicals, or they may be unsaturated, that is, alkenyl radicals such as vinyl or allyl radicals, but they may also be branched, for example isopropyl radicals.

In their turn the alkyl radicals and phenyl radicals of the substituted imidazoles may be also substituted, suitable substituents for the alkyl radicals being CN, OH, OCH$_3$ as well as phenyl or aromatic substituents. Examples of such substituted alkyl radicals are 2-cyanoethyl, 2-hydroxyethyl, 2-methoxyethyl, benzyl or 2-(3,5-diamino-s-triazinyl)ethyl radicals.

The phenyl radicals in the 1-, 2-, 4- or 5-position of the imidazole may be likewise substituted, suitable substituents being OH, OCH$_3$, NH$_2$, halogen or CN groups.

The imidazoles which may be used according to the invention, are known and some are available commercially, or they may be very simply prepared by conventional methods.

It is an essential part of the invention that the adducts and/or reaction products of the imidazole derivative should be produced using such organic acids whose $pK_A$ value lies between 0.5 and 5.0. Examples of such acids are acetic acid, formic acid, maleic acid, fumaric acid, lactic acid, salicylic acid, p-hydroxybenzoic acid and anthranilic acid. Salicylic acid is particularly preferred.

Within the scope of the present invention it is of course also possible to use instead of the organic acids their salts and/or their acid anhydrides. Of the acid anhydrides, maleic anhydride has proved to be particularly advantageous for this purpose.

The molar ratio of the two components imidazole derivative and organic acid may be varied within a wide range. Preferred molar ratios of imidazole to acid are 1:1 to 1:2.5, preferably 1:1 to 1:1.2. When acid anhydrides are used, attention must be paid to the twin acid function i.e. 50% of the molar amount compared with the acid is used.

The preparation of the accelerators according to the invention from the components (a) and (b) may be carried out in a variety of ways, the variants I to III below being particularly technically simple and cost effective.

Variant I: Intimate mixing of the components in the solid state, followed by grinding if appropriate.

Variant II: Mixing of the components, heating to melting and, if appropriate, comminuting after cooling.

Variant III: Dissolving the components in suitable solvents such as water, alcohols (for example methanol or ethanol), dimethylformamide, ketones etc., on heating and crystallizing out the product (for example as the salts) on cooling.

The accelerators according to the invention may be employed with cyanamide for the curing of conventional epoxy resin systems without any difficulties; the epoxy resins may be present both in liquid and dissolved form.

The amount of the accelerator used according to the invention is governed essentially by the amount of the curing agent or the epoxy resin. The amounts of the accelerator used are preferably 1 to 10% by weight based on the weight of the cyanamide and usually 0.1 to 1% by weight based on the weight of the epoxy resin.

If the accelerators according to the invention are incorporated in the epoxy resins in solid form, then they should be in a form as finely divided as possible in order to achieve a distribution as uniform as possible and optimum effect. The particle size should accordingly be <150 μm.

The epoxide curing with the aid of the accelerators according to the invention is carried out at temperatures of 100° to 200° C., preferably of 140° to 180° C. In the curing process it is possible to make use of the heat of the exothermic reaction to attain complete curing even at low starting temperatures.

The accelerators according to the invention provide all the benefits which are essential for the practical technical application, such as satisfactory action, problem-free handling and good shelf life of the epoxy resin-curing agent-accelerator mixtures.

The examples below are intended to elucidate the invention without limiting it in any way.

EXAMPLES

The viscosity characteristics of epoxy resin mixtures containing cyanamide are investigated in the Examples 1 and 2 below using different accelerators.

EXAMPLE 1

A 40% solution of cyanamide in methoxypropanol was used as the curing agent solution.

The following accelerators were used:
Accelerator 1=benzyldimethylamine (comparison)
Accelerator 2=2-methylimidazole (comparison)
Accelerator 3=adduct of 2-methylimidazole and salicylic acid (molar ratio 1:1.04) (prepared by variant I by intimately mixing the components with a particle size <100 μm)
Accelerator 4=adduct of 2-methylimidazole and maleic anhydride (molar ratio 1:0.52) (produced by variant I by intimately mixing the components, followed by grinding with cooling to a particle size of <100 μm)

To study the viscosity characteristics, the viscosities of the above mixtures were measured at 25° C. using a Ubbelohde viscometer immediately after the preparation and then at intervals of 24 hours during storage at 22° C. The viscosity increases relative to the initial viscosity are shown in Table 1.

TABLE 1

Mixture of 133.3 g of epoxy resin (Rutapox 2040 MEK 75), 7.5 g of curing agent solution, 5 g of methoxypropanol and the stated amounts of accelerator.

| Accelerator | Amount | Initial viscosity (cSt) | Viscosity increase based on initial viscosity | | |
|---|---|---|---|---|---|
| | | | 1 d | 2 d | 3 d |
| No. 1 (C) | 0.1 g | 484.8 | 121% | — | — |
| No. 2 (C) | 0.1 g | 475.4 | 16% | 95% | 236% |
| No. 3 (I) | 0.2 g | 468.7 | 5% | 11% | 16% |
| No. 4 (I) | 0.2 g | 486.3 | 3% | 13% | 21% |

(C) = comparison
(I) = invention

EXAMPLE 2

A solution of 5% by weight of dicyandiamide and 5% by weight of cyanamide in methoxypropanol were used as the curing agent solution.

The products corresponding to Example 1 were used as accelerators 1 to 4.

For the viscosity studies corresponding to Example 1 the relative viscosity increases listed in Table 2 were measured.

TABLE 2

Mixture of 133.3 g of epoxy resin (Rutapox 2040 MEK 75), 30 g of curing agent solution, 5 g of methoxypropanol and the stated amounts of accelerator.

| Accelerator | Amount | Initial viscosity (cSt) | Viscosity increase based on initial viscosity | | |
|---|---|---|---|---|---|
| | | | 1 d | 2 d | 3 d |
| No. 1 (C) | 0.1 g | 139.1 | 32% | 55% | 85% |
| No. 2 (C) | 0.1 g | 137.9 | 8% | 23% | 51% |
| No. 3 (I) | 0.2 g | 134.7 | 1% | 8% | 8% |
| No. 4 (I) | 0.2 g | 138.9 | 4% | 8% | 16% |

(C) = comparison
(I) = invention

I claim:

1. A process for accelerating the curing of epoxide resins using a cyanamide curing agent which comprises using as an accelerator an adduct and/or a reactant product of (a) an imidazole of the formula

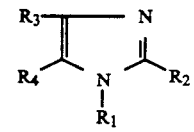

in which $R_1$, $R_2$, $R_3$, and $R_4$ are hydrogen, alkyl or alkenyl of 1 to 3 carbon atoms or phenyl with (b) an organic acid, organic acid salt or organic acid anhydride having a $pK_A$ value of 0.5 to 5.0.

2. The process as claimed in claim 1, wherein at least one radical of the imidazole is alkenyl.

3. The process as claimed in claim 1, wherein the alkyl and/or phenyl radical is substituted.

4. The process as claimed in claim 3, wherein the substituent(s) for the alkyl radical are CN, OH, $OCH_3$, phenyl or 3,5-diamino-s-triazinyl.

5. The process as claimed in claim 3, wherein the substituent(s) for the phenyl radical are OH, $OCH_3$, $NH_2$, halogen or CN.

6. The process as claimed in claim 1, wherein salicylic acid is used as the organic acid.

7. The process as claimed in claim 1, wherein organic acid salts and/or acid anhydrides are used.

8. The process as claimed in claim 7, wherein maleic anhydride is used as the acid anhydride.

9. The process as claimed in claim 1, wherein about 1 to about 10% by weight of said accelerator is used based on the weight of the cyanamide curing agent.

10. The process as claimed in claim 1, wherein said accelerator is particulate and has a particle size of less than 150 μm.

11. The process as claimed in claim 1, wherein said curing is performed at temperatures of 100° to 200° C.

* * * * *